United States Patent
Jacquemmoz et al.

(10) Patent No.: US 7,812,209 B2
(45) Date of Patent: Oct. 12, 2010

(54) METHOD FOR SOLIDIFYING AND STABILIZING A CONCENTRATED AQUEOUS SODIUM HYDROXIDE SOLUTION

(75) Inventors: Christian Jacquemmoz, Aix En Provence (FR); Alain Jean Pierre, Venelles (FR); Filipe Teixeira, Aix En Provence (FR); Jean-Yves Cojan, Neuilly sur Seine (FR); David Verschuere, Le Val David (FR); Fabrice Ledoyen, Saint Pierre d'Autils (FR)

(73) Assignee: INERTEC, Nanterre (FR)

( * ) Notice: Subject to any disclaimer, the term of this patent is extended or adjusted under 35 U.S.C. 154(b) by 496 days.

(21) Appl. No.: 11/883,688

(22) PCT Filed: Feb. 3, 2006

(86) PCT No.: PCT/FR2006/050097

§ 371 (c)(1),
(2), (4) Date: Aug. 3, 2007

(87) PCT Pub. No.: WO2006/082346

PCT Pub. Date: Aug. 10, 2006

(65) Prior Publication Data

US 2008/0139864 A1     Jun. 12, 2008

(30) Foreign Application Priority Data

Feb. 4, 2005   (FR) .................................. 05 01125

(51) Int. Cl.
*G21F 9/00* (2006.01)
(52) U.S. Cl. .......................... 588/3; 588/318
(58) Field of Classification Search ...... 588/3, 588/300, 313, 401, 314, 319, 18, 20
See application file for complete search history.

(56) References Cited

U.S. PATENT DOCUMENTS 4,476,048 A  *  10/1984  Ambros et al. ................ 588/20

FOREIGN PATENT DOCUMENTS

| EP | 0 709 859 | 5/1996 |
|---|---|---|
| EP | 0 831 498 | 3/1998 |
| EP | 1 137 014 | 9/2001 |
| EP | 1 367 032 | 12/2003 |
| JP | 2002 243892 | 12/2002 |

OTHER PUBLICATIONS

International Search Report for International Application No. PCT/FR2006/050097 dated Jul. 17, 2006.
Database WPI, Section Ch, Week 198747, Derwent Publications Ltd., London, GB: AN 1987-332020 X00P2351351 & JP 62 238499 A (Denki Kagaku Kogyo KK), Oct. 19, 1987 abstract.

* cited by examiner

*Primary Examiner*—Edward M Johnson
(74) *Attorney, Agent, or Firm*—Hamre, Schumann, Mueller & Larson, P.C.

(57) ABSTRACT

The present invention relates to a process for the solidification and stabilization of concentrated aqueous sodium hydroxide solution, characterized in that the following steps are carried out:

a) a hydraulic binder containing blast furnace slag is mixed with said sodium hydroxide solution, in the presence of at least one additional source of calcium ions and/or magnesium ions and/or silica, to form a slurry, and b) the slurry is left to set to a solid product.

The invention further relates to the solid product obtained by carrying out the process of the invention. The invention can be applied to the treatment of sodium hydroxide solutions that are radioactive or contaminated by other pollutants.

23 Claims, No Drawings

METHOD FOR SOLIDIFYING AND STABILIZING A CONCENTRATED AQUEOUS SODIUM HYDROXIDE SOLUTION

The present invention relates to the field of the treatment of industrial waste.

More particularly, the invention relates to a process for the solidification and stabilization of concentrated aqueous sodium hydroxide solution. Concentrated sodium hydroxide solution can be radioactive when it originates from nuclear reactors. Concentrated sodium hydroxide solution can also be contaminated by other pollutants.

TECHNOLOGICAL BACKGROUND

The nuclear industry has designed power stations that are capable of producing large amounts of energy from a small amount of nuclear fuel. It has thus developed steam generators requiring advanced heat transfer systems, which can be characterized as pressurized water systems or, for breeder reactors or fast neutron reactors, systems based on molten sodium metal.

The liquid sodium used as heat transfer fluid in the primary and secondary circuits of fast neutron reactors has to be treated when the circuits are dismantled. To reduce the chemical risk of storing the sodium in its liquid metallic form, it is converted to concentrated sodium hydroxide solution.

The approach adopted hitherto consists of a two-step conversion of the liquid sodium metal potentially contaminated by radioactive isotopes: a hydrolysis step to convert said sodium to sodium hydroxide, and a solidification/stabilization step to convert the sodium hydroxide to a solid whose stability is compatible with storage at an appropriate central point.

The process according to the present invention can be applied to this second step.

It is also desirable to be able to solidify and stabilize concentrated aqueous sodium hydroxide solution contaminated by other pollutants. Possible examples of such pollutants which may be mentioned are organic products and heavy metals (zinc, lead, arsenic, etc.).

The problem therefore consists in incorporating aqueous sodium hydroxide solution into a solid matrix with a high loading rate of the aqueous solution.

Patent FR 2804103 has already disclosed a process for the conditioning of aqueous sodium hydroxide solution to give solid compounds of the "nepheline" type. These are obtained by reacting the sodium hydroxide with compounds that provide silica and alumina, such as metakaolin, bentonite, dickite, halloysite and pyrophillite. After a primary reaction, which takes place at ambient temperature to form a precipitate of the zeolite type (cancrinite), a second treatment phase at a temperature between 1000 and 1500° C. makes it possible to convert this zeolite to very sparingly soluble nepheline (sodium aluminosilicate).

It is clearly understood that such a process is very efficient since it enables all the sodium present to be converted to a practically insoluble mineral. However, this process has the disadvantage of requiring two treatment steps, the second of which consists of a high-temperature heating phase.

The main object of the invention is to provide a process in which concentrated aqueous sodium hydroxide solution can be solidified directly at ambient temperature.

SUMMARY OF THE INVENTION

The object of the present invention is therefore to propose a one-step process that makes it possible, at ambient temperature and in advantageous manner, to solidify concentrated aqueous sodium hydroxide solution to give a stable, massive solid block with a very high sodium incorporation rate.

The process according to the invention comprises mixing concentrated aqueous sodium hydroxide solution with a hydraulic binder containing blast furnace slag, in the presence of at least one additional source of calcium ions and/or magnesium ions and/or silica, to form a slurry. At least one of these three components (additional source of calcium ions, additional source of magnesium ions, additional source of silica) is necessary for carrying out the invention. Within the framework of the invention, it is also possible to use combinations of two components selected from these three components, or to use all three.

The present invention therefore consists of a process for the solidification and stabilization of concentrated aqueous sodium hydroxide solution, characterized in that the following steps are carried out:

a) a hydraulic binder containing blast furnace slag is mixed with said sodium hydroxide solution, in the presence of at least one additional source of calcium ions and/or magnesium ions and/or silica, to form a slurry, and b) the slurry is left to set to a solid product.

"Hydraulic binder" is understood as meaning any compound capable of developing hydraulic properties, i.e. of forming hydrates, and capable of developing setting and hardening properties.

"Blast furnace slag" or "slag" is understood as meaning a material obtained by rapid cooling of the scoria originating from the fusion of iron ore in a blast furnace, which has been ground to a particle size below 200 μm and preferably below 100 μm.

"Slag cement" is understood as meaning a hydraulic binder containing slag and "clinker", the latter being obtained by burning mixtures of limestone (predominantly) and clay.

"Additional source" is understood as meaning a source other than that provided by the constituents already present in the hydraulic binder. In fact, hydraulic binders themselves constitute sources of Ca, Mg or $SiO_2$ and, within the framework of the present invention, that which is provided by the hydraulic binder is supplemented by adding a source of at least one of these species.

"Slurry" is understood as meaning a suspension of mineral particles in water. In the context of the use of hydraulic binders, the "slurry" will consist of a mixture of water, particles of hydraulic binder(s) and other optional mineral or organic components.

DETAILED DESCRIPTION OF THE INVENTION

More particularly, the present invention relates to a process for the solidification and stabilization of radioactive or non-radioactive concentrated aqueous sodium hydroxide solution by the production of a slurry that is easy to use.

In one preferred embodiment of the invention, the slurry composition will be chosen such that the slurry has a good fluidity and retains its flow properties for an appropriate period of time in view of the industrial conditions under which the invention is carried out. In order to be able to transfer the slurry from the mixer to a container that can be used as a final storage means, it can be of particular value to ensure a workability time of at least about 30 minutes, and tests have demonstrated the possibility of maintaining the flow properties for about 45 or even 60 minutes.

In another preferred embodiment of the invention, it is possible to envisage working under conditions where the workability is maintained for a restricted period, limiting the transfer of the constituted slurry to a container. In this embodiment, the container serves as a mixer.

Once the slurry has been prepared by the mixing of its constituent components, it is left to set so as to develop its mechanical properties, thereby ensuring a limited diffusion of the sodium hydroxide into the external medium. The hardened slurries obtained by carrying out the process according to the invention exhibit neither bleeding nor exudation phenomena.

The process according to the invention is particularly simple to carry out since it merely amounts to the production of a slurry, which is an operation well known to those skilled in the art. In addition to the sodium hydroxide solution, the hydraulic binder containing blast furnace slag, and at least one additional source of calcium ions and/or magnesium ions and/or silica, the slurry according to the invention can contain an adjuvant of the "plasticizer" type and/or of the "retarder" type.

Preferably, when the slurry according to the invention is prepared, the hydraulic binder containing blast furnace slag, the additional source(s) of calcium ions and/or magnesium ions and/or silica, and optional adjuvants, are added successively to the sodium hydroxide solution to be treated.

The constituents of the slurry can be added in any order to produce a slurry according to the invention. However, in one currently preferred embodiment, the adjuvant of the "plasticizer" type and/or of the "retarder" type is added to the sodium hydroxide first (if an adjuvant is used), followed by the hydraulic binder containing slag, and then by the additional source(s) of calcium ions and/or magnesium ions and/or silica.

It is also possible to mix two, three or more solid constituents together before adding them to the sodium hydroxide solution to be treated.

In the context of treating the concentrated sodium hydroxide solution by incorporation into a matrix based on hydraulic binder containing blast furnace slag, it is optionally possible to envisage adding water to dilute the slurry. This is not recommended, however, because one of the desired objectives is to maximize the sodium incorporation rate per unit volume of slurry.

In one preferred embodiment of the invention, the slurry obtained by mixing its constituent components in a mixer can then be poured into a container that can be used as a packaging means. The containers used will preferably be flexible and leaktight (commonly called "big bags"). The volume of these leaktight flexible containers is generally in the order of 1 m³, especially greater than or equal to 0.4 m³ and preferably between at least about 0.5 m³ and about 2 m³.

In another preferred embodiment of the invention, the slurry is left to set directly without being transferred to a new receptacle after preparation. In the case in point, the packaging container also serves as a mixer. This embodiment will be of particular value when the rapid rise in viscosity of the slurry means that it cannot flow easily, if at all, after preparation. In such cases it may also be noted that the moving part of the stirrer used to mix the constituents of the slurry will generally have to be permanently incorporated into the slurry. The volume of the container in this embodiment, without transfer of the slurry after constitution, will generally be less than 1 m³, preferably less than or equal to 0.4 m³ and particularly preferably less than or equal to 0.2 m³.

According to the invention, the slurry (optionally packaged) is left to set to a solid block.

The present invention further relates to the solid product obtained by carrying out the process described above. The solid product according to the present invention is characterized in that it contains waste consisting of radioactive or non-radioactive concentrated aqueous sodium hydroxide solution, and products resulting from the chemical reaction between the concentrated aqueous sodium hydroxide solution, the hydraulic binder containing slag, and the source(s) of calcium and/or magnesium and/or silica.

The solid product according to the present invention is characterized by a sodium incorporation rate that is preferably greater than 100 kg/m³ of slurry. Advantageously, the amount of sodium incorporated in the slurry is between 100 and 400 kg/m³ of slurry and particularly preferably between 120 and 220 kg/m³ of slurry. This sodium incorporation rate is measured at the time of preparation of the slurry, taking into account the density of the slurry and the amount of sodium hydroxide used. It has been found that the incorporation rate does not vary greatly after preparation of the slurry, even though a variation in the sodium incorporation rate over a long storage period cannot be excluded, at least in those parts of the solid block of hardened slurry which are exposed to the external medium.

The concentration of the sodium hydroxide solution to be treated within the framework of the process according to the invention is preferably between 8 N and 18 N and particularly preferably between 8 N and 14 N.

The hydraulic binder according to the invention advantageously consists of a blast furnace slag cement (CEM III A, B or C). The compositions of the blast furnace slag cements designated as "CEM III A", "CEM III B" and "CEM III C" are defined by industrial standards in the field of cements, especially by standard NF EN 197-1.

It is also possible to use pure slag ground to a particle size preferably below 100 μm. A customary average composition of pure slag is as follows: $Al_2O_3$-7.5 to 12.5%; $Fe_2O_3$-0.35 to 1.75%; CaO-37 to 47%; MgO-5 to 8%; $SiO_2$-33 to 37%.

In general, and regardless of its nature, the hydraulic binder which can be used within the framework of the invention preferably comprises particles with a size predominantly below 200 μm and preferably below 100 μm.

Advantageously, the weight ratio of the amount of hydraulic binder containing blast furnace slag to the amount of aqueous sodium hydroxide solution (weight/weight) is between 0.3 and 2 and preferably between 0.4 and 1.5.

The amount of water relative to the hydraulic binder will therefore depend on this ratio (weight of hydraulic binder)/(weight of aqueous sodium hydroxide solution) and on the concentration of the aqueous sodium hydroxide solution used.

The Applicant proposes, without this possible theoretical interpretation of the process implying a limitation of the invention, that the incorporation of an additional source of calcium ions and/or magnesium ions would assist in controlling the viscosity of the slurry by neutralizing part of the concentrated aqueous sodium hydroxide solution, allowing the formation of $Ca(OH)_2$ and $Mg(OH)_2$ respectively. For example, it is considered that the calcium chloride used in the process of the present invention would probably be converted very rapidly to lime (with the production of sodium chloride). The calcium sulfate, including anhydrite, would be converted to lime (with the production of sodium sulfate) at a significant rate, but more slowly than in the case of calcium chloride. The calcite or calcium carbonate would be converted to lime (with the production of sodium carbonate).

It is considered that the flow properties of the slurry depend on the properties of the charged mineral particles that will flocculate and increase the viscosity of the slurry.

The partial neutralization of the concentrated aqueous sodium hydroxide solution in a first stage, and then the action of the silica to allow the formation of hydrated calcium silicates in a second stage, will improve the homogeneous setting of the slurry.

The additional source of calcium and/or magnesium is preferably selected from the nitrate, sulfate, chloride and carbonate salts of calcium or magnesium or a calcium-rich thermal power station ash such as a sulfo-calcium ash, ground dolomite ($CaMg(CO_3)_2$) or ground calcite (calcium carbonate). The sources of calcium sulfate which can be used within the framework of the present invention as an additional calcium source include especially plaster and gypsum (hydrated calcium sulfates) and anhydrite (anhydrous calcium sulfate).

According to the invention, the ratio of the number of mol of calcium and/or magnesium mixed with the slurry as an additional source (additional sources) of calcium and/or magnesium ions, to the number of mol of sodium in the aqueous NaOH solution, is preferably between 0.01 and 0.6 and particularly preferably between 0.05 and 0.45.

According to the invention, a source of silica, selected from ground silica, thermal power station silico-aluminous fly ash and/or fluidized bed ash, can also be incorporated into the mixture at a rate of 25 to 500 kg of ash per $m^3$ of slurry, preferably of 50 to 350 kg per $m^3$ of slurry, the volume of the slurry being determined at the time of its preparation by mixing of the solid constituents with the liquid sodium hydroxide.

Within the framework of the present invention, the viscosity of the slurry increases very rapidly after mixing of the hydraulic binder containing blast furnace slag and the concentrated aqueous sodium hydroxide solution. It may therefore be desirable, or even essential under certain operating conditions, to add an adjuvant of the "plasticizer" or "retarder" type in order to control the viscosity of the mixture and its workability time. It may be desirable to have a sufficient time, if appropriate, to transfer the slurry to a container that can be used as a packaging means. In particular, it may be desirable for the slurry not to set prematurely after it has been constituted by the mixing of its constituent components. It may also be desirable to slow down the setting in order to avoid an excessive evolution of heat. In particular, it will be preferable to prevent the core of a 1 $m^3$ block from reaching a temperature above 95° C. when the binders set. It may therefore be desirable, or even essential under certain operating conditions, to add an adjuvant of the "retarder" type in order to avoid excessively rapid setting.

As far as adjuvants are concerned, it should be noted that some products known in particular for their plasticizing function also have retarding properties, and vice-versa.

The plasticizers within the framework of the present invention disperse all the aggregates which may be present in the slurry so as to produce a homogeneous mixture and reduce the force required to mix the cement with the concentrated aqueous sodium hydroxide solution.

Suitable plasticizers can be selected from the group comprising naphthalenesulfonate polymers, melamine/formaldehyde polymers, water-soluble acrylic polymers (such as those of the range marketed under the name Bentocryl®) and polyoxyethylene-polycarboxylate polymers (such as those of the Chrysofluid® range).

The slurry used in the process according to the invention can also comprise a setting retarder of the lignosulfonate or gluconate type, e.g. sodium gluconate (such as those of the Résitard P®, Cimaxtard® or Chrysotard® ranges) or a mixture of sodium gluconate and sodium phosphate (such as those of the SIKA retarders range).

The adjuvants of the "plasticizer" and/or "retarder" type which are most preferred in the present invention are selected from gluconate-based products and more particularly from those of the Cimaxtard® and SIKA retarders ranges.

Within the framework of the present invention, if the slurry is produced with a sodium hydroxide concentration towards the bottom of the range of interest (8 to 18 N), particularly of around 10 N, it is desirable to add an adjuvant of the "plasticizer" and/or "retarder" type in order to maintain a sufficient workability time, especially if it is desired to transfer the slurry, after preparation, from a mixer to another container.

Thus, according to a first preferred feature of the invention, the latter relates to a process for the solidification and stabilization of aqueous sodium hydroxide solution having a concentration of between 8 N and 14 N, characterized in that the following steps are carried out:

a) a hydraulic binder containing blast furnace slag is mixed with said sodium hydroxide solution, in the presence of at least one additional source of calcium ions and/or magnesium ions and/or silica, and in the presence of at least one adjuvant of the "plasticizer" and/or "retarder" type, to form a slurry, and b) the slurry is left to set to a solid product.

As regards the concentration of the adjuvants, the slurry used in the process according to the invention, when at least one adjuvant is used, contains preferably from 0.05 to 5% and particularly preferably from 0.05 to 2% of adjuvant(s) of the "plasticizer" and/or "retarder" type, expressed by dry weight of adjuvant, based on the dry weight of hydraulic binder.

Within the framework of the present invention, if the slurry is produced with a sodium hydroxide concentration towards the top of the range of interest (8 to 18 N), particularly of around 18 N, it is not necessary to add an adjuvant of the "plasticizer" and/or "retarder" type in order to maintain a sufficient workability time to allow the transfer of the slurry after preparation. On the other hand, it has been discovered, totally surprisingly, that only the additional calcium sources containing calcium sulfate make it possible to regulate the initial setting and thus to have a sufficient workability time to transfer the slurry by allowing it to flow. The additional calcium sources containing calcium sulfate which are particularly preferred within the framework of this embodiment are selected especially from anhydrite, gypsum and plaster, anhydrite being the most preferred source.

Thus, according to a second preferred feature of the invention, the latter relates to a process for the solidification and stabilization of aqueous sodium hydroxide solution having a concentration of between 14 N and 18 N, characterized in that the following steps are carried out:

a) a hydraulic binder containing blast furnace slag is mixed with said sodium hydroxide solution, in the presence of an additional source of calcium ions containing calcium sulfate, and optionally of at least one other additional source of calcium ions and/or magnesium ions and/or silica, to form a slurry, and b) the slurry is left to set to a solid product.

In another preferred embodiment of the invention, it can be envisaged to work under rapid setting conditions, limiting the transfer of the constituted slurry to a container. In this embodiment, the container serves as a mixer. This embodiment will be of particular value when the rapid rise in viscosity of the slurry means that it cannot flow easily, if at all, after preparation, this phenomenon being observed in the absence of retarder and especially at sodium hydroxide concentrations of between 8 N and 14 N.

Thus, according to a third preferred feature of the invention, the latter relates to a process for the solidification and stabilization of aqueous sodium hydroxide solution having a concentration of between 8 N and 18 N, preferably of between 8 N and 14 N, characterized in that the following steps are carried out:

a) a hydraulic binder containing blast furnace slag is mixed with said sodium hydroxide solution, in the presence of at least one additional source of calcium ions and/or magnesium ions and/or silica, and in the absence of an adjuvant of the "plasticizer" and/or "retarder" type, to form a slurry, and b) the slurry is left to set to a solid product.

This last embodiment will preferably be carried out using a container with a volume less than 1 m$^3$, preferably less than or equal to 0.4 m$^3$ and particularly preferably less than or equal to 0.2 m$^3$. Restricted container volumes are preferable, especially because of the sharp temperature rise associated with rapid setting.

For the purpose of clarifying the invention, several modes of carrying it out will now be described; they are given as Examples that do not limit the scope of the invention.

EXAMPLES

Example 1

The following are introduced successively into a high-turbulence mixer in order to solidify/stabilize 867 kg of 10 N aqueous sodium hydroxide solution:

| | |
|---|---|
| CaCl$_2$•2H$_2$O | 280 kg |
| Retarder (Résitard P ® 608A)* | 3.66 kg |
| Fluidized bed ash | 75 kg |
| CEM III C | 475 kg |

*Résitard P ® 608A retarder is a sodium gluconate.

This composition is mixed for 3 min 30 sec and then poured into a "big bag". Test pieces are made up in plastic moulds (Ø=4 cm, h=8 cm) for evaluation of the performance characteristics. The slurry prepared in this way retained its flow properties for 60 min. After ageing for 28 days to allow the hydraulic binder to set and develop its mechanical properties, this test piece is subjected to a compressive strength test according to standard NF P 18-406, the result of which, given in megapascals (MPa), is indicated below (Rc MPa value), and to a leaching test according to standard XP X 31-211. In fact, it is desirable to obtain an Rc MPA value of at least 3 MPa. Inter alia, by allowing stacking, a high compressive strength will facilitate storage of the massive blocks of solidified slurry containing sodium hydroxide. The eluate is the result of contact between a solid product and 10 times its dry weight of water for 24 hours, with agitation. The eluate obtained is then analysed to determine the fraction that is still soluble. The results of these tests are as follows:

| | |
|---|---|
| Rc MPa | 5.37 MPa |
| Sodium content | 147 kg/m$^3$ |

Result on eluate according to standard XP X 31-211 (1×24 h):

| | |
|---|---|
| pH | 12.55 |
| Soluble fraction | 7.94% |

Example 2

The following are introduced successively into a high-turbulence mixer in order to solidify/stabilize 867 kg of 10 N aqueous sodium hydroxide solution:

| | |
|---|---|
| Ground dolomite | 100 kg |
| Retarder (Résitard P ® 608A) | 3.5 kg |
| CEM III C | 500 kg |

This composition is mixed for 3 min 30 sec and then poured into a "big bag". Test pieces are made up for evaluation of the performance characteristics. The slurry prepared in this way retained its flow properties for 60 min. After ageing for 28 days, the solid product has the following characteristics:

| | |
|---|---|
| Rc MPa | 4.36 MPa |
| Sodium content | 171 kg/m$^3$ |

Result on eluate according to standard XP X 31-211 (1×24 h):

| | |
|---|---|
| pH | 12.91 |
| Soluble fraction | 10% |

Example 3

The following are introduced successively into a high-turbulence mixer in order to solidify/stabilize 867 kg of 10 N aqueous sodium hydroxide solution:

| | |
|---|---|
| Ground calcite | 190 kg |
| Retarder (Résitard P ® 608A) | 3.7 kg |
| Fluidized bed ash | 75 kg |
| CEM III C | 475 kg |

This composition is mixed for 3 min 30 sec and then poured into a "big bag". Test pieces are made up for evaluation of the performance characteristics. The slurry prepared in this way retained its flow properties for 60 min. After ageing for 28 days, the solid product has the following characteristics:

| | |
|---|---|
| Rc MPa | 6.38 MPa |
| Sodium content | 161 kg/m$^3$ |

Result on eluate according to standard XP X 31-211 (1×24 h):

| | |
|---|---|
| pH | 12.97 |
| Soluble fraction | 6.2% |

Example 4

The following are introduced successively into a high-turbulence mixer in order to solidify/stabilize 1125 kg of 18 N aqueous sodium hydroxide solution (50%):

| | |
|---|---|
| Anhydrite | 135 kg |
| Ground slag powder | 520 kg |

This composition is mixed for 3 min 30 sec and then poured into a "big bag". Test pieces are made up for evaluation of the performance characteristics. The slurry prepared in this way retained its flow properties for 45 min. After ageing for 28 days, the solid product has the following characteristics:

| | |
|---|---|
| Rc MPa | 5.8 MPa |
| Sodium content | 320 kg/m$^3$ |

Result on eluate according to standard XP X 31-211 (1×24):

| | |
|---|---|
| pH | 13.23 |
| Soluble fraction | 13.45% |

Example 5

The following are introduced successively into a high-turbulence mixer in order to solidify/stabilize 977 kg of 10 N aqueous sodium hydroxide solution:

| | |
|---|---|
| Ground dolomite | 84.5 kg |
| Chrysotard ® retarder | 16.9 kg |
| Silico-aluminous ash | 84.5 kg |
| CEM III C | 507 kg |

This composition is mixed for 3 min 30 sec and then poured into a "big bag". Test pieces are made up for evaluation of the performance characteristics. The slurry prepared in this way retained its flow properties for 60 min. After ageing for 28 days, the solid product has the following characteristics:

| | |
|---|---|
| Rc MPa | 5.38 MPa |
| Sodium content | 170 kg/m$^3$ |

Result on eluate according to standard XP X 31-211 (1×24 h):

| | |
|---|---|
| pH | 13.04 |
| Soluble fraction | 8.45% |

Example 6

The following are introduced successively into a high-turbulence mixer in order to solidify/stabilize 977 kg of 10 N aqueous sodium hydroxide solution:

| | |
|---|---|
| Ground silica | 192 kg |
| Retarder (Résitard P ® 608A) | 7.7 kg |
| CEM III C | 769 kg |

This composition is mixed for 3 min 30 sec and then poured into a "big bag". Test pieces are made up for evaluation of the performance characteristics.

The slurry prepared in this way retained its flow properties for 60 min. After ageing for 28 days, the solid product has the following characteristics:

| | |
|---|---|
| Rc MPa | 16.9 MPa |
| Sodium content | 150 kg/m$^3$ |

Result on eluate according to standard XP X 31-211 (1×24 h):

| | |
|---|---|
| pH | 12.76 |
| Soluble fraction | 5.54% |

The invention claimed is:

1. A method for the solidification and stabilization of concentrated aqueous sodium hydroxide solution, wherein the following steps are carried out:
   a) a hydraulic binder containing blast furnace slag is admixed with said sodium hydroxide solution originating from a nuclear reactor, to form a slurry, and
   b) the slurry is left to set to a solid product, wherein at least one additional source selected from the group consisting of a calcium ion, a magnesium ion, a silica, or any mixture thereof, is added in step a), and wherein the sodium incorporation rate is greater than or equal to 100 kg/m$^3$ of solidified slurry.

2. The method according to claim 1 wherein, in step (a), the slurry is prepared in the presence of at least one adjuvant selected from the group consisting of a plasticizer, a retarder, and any mixture thereof.

3. The method according to claim 1, wherein the concentration of the sodium hydroxide solution is between 8 N and 18 N.

4. The method according to claim 2, wherein the concentration of the sodium hydroxide solution is between 8 N and 14 N.

5. The method according to claim 2 wherein the adjuvant of the plasticizer or retarder type is used in an amount of 0.05 to 5% by dry weight of adjuvant, based on the dry weight of hydraulic binder.

6. The method according to claim 5, wherein the adjuvant of the plasticizer or retarder type is used in an amount of 0.05 to 2% by dry weight of adjuvant, based on the dry weight of hydraulic binder.

7. The method according to claim 2 wherein the adjuvant of the plasticizer or retarder type is selected from the group consisting of naphthalene sulfonate polymers, melamine/formaldehyde polymers, water-soluble acrylic polymers, polyoxyethylene-polycarboxylate polymers, and setting retarders selected from a lignosulfonate setting retarder , a gluconate- setting retarder, and any mixture thereof.

8. The method according to claim 7, wherein the adjuvant of the plasticizer or retarder type is based on sodium gluconate.

9. The method according to claim 1, wherein the calcium or magnesium source is selected from the group consisting of nitrate, sulfate, chloride and carbonate salts of calcium or magnesium.

10. The method according to claim 9, wherein the calcium source is selected from the group consisting of a calcium-rich thermal power station ash, sulfo-calcium ash, anhydrite (calcium sulfate), ground dolomite ($CaMg(CO_3)_2$) ground calcite (calcium carbonate), and any mixture thereof.

11. The method according to claim 10, wherein the magnesium source is ground dolomite ($CaMg(CO_3)_2$).

12. The method according to claim 9, wherein the calcium source comprises calcium sulfate and the concentration of the sodium hydroxide solution is between 14 N and 18 N.

13. The method according to claim 12, wherein the calcium source is anhydrite.

14. The method according to claim 1 , wherein the ratio of the amount of calcium and/or magnesium in the slurry to the amount of sodium (mol/mol) is between 0.01 and 0.6.

15. The method according to claim 1, wherein the ratio of the amount of hydraulic binder containing blast furnace slag to the amount of aqueous sodium hydroxide solution (weight/weight) is between 0.3 and 2.

16. The method according to claim 1, wherein the ratio of the amount of hydraulic binder containing blast furnace slag to the amount of aqueous sodium hydroxide solution (weight/weight) is between 0.4 and 1.5.

17. The method according to claim 1, wherein the hydraulic binder is selected from the group consisting of a blast furnace slag cement (CEM III A, B or C) and ground pure slag.

18. The method according to claim 17, wherein the hydraulic binder comprises particles with a size predominantly below 200 μm.

19. The method according to claim 17, wherein the hydraulic binder comprises particles with a size predominantly below 100 μm.

20. The method according to claim 1, wherein said slurry contains a source of silica selected from the group consisting of ground silica, thermal power station silico-aluminous fly ash, fluidized bed ash, and any mixture thereof.

21. The method according to claim 20, wherein the amount of ash is between 25 kg and 500 kg per $m^3$ of slurry.

22. The method according to claim 20, wherein the amount of ash is between 50 kg and 350 kg per $m^3$ of slurry.

23. The method according to claim 1, wherein said slurry is packaged in a container that can be used as storage means.

* * * * *